(12) United States Patent
Maestas

(10) Patent No.: US 11,134,150 B1
(45) Date of Patent: *Sep. 28, 2021

(54) AI ASSISTANT FOR INTERACTING WITH CUSTOMERS ACROSS MULTIPLE COMMUNICATION MODES

(71) Applicant: UIPCO, LLC, San Antonio, TX (US)

(72) Inventor: Jerry John Maestas, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/841,216

(22) Filed: Apr. 6, 2020

Related U.S. Application Data

(63) Continuation of application No. 16/419,042, filed on May 22, 2019, now Pat. No. 10,708,424.

(60) Provisional application No. 62/741,752, filed on Oct. 5, 2018.

(51) Int. Cl.
  *H04M 3/51* (2006.01)
  *H04L 12/58* (2006.01)
  *G10L 17/04* (2013.01)
  *H04M 3/42* (2006.01)

(52) U.S. Cl.
  CPC .......... *H04M 3/5141* (2013.01); *G10L 17/04* (2013.01); *H04L 51/36* (2013.01); *H04M 3/5175* (2013.01); *H04M 3/5183* (2013.01); *H04M 3/42221* (2013.01)

(58) Field of Classification Search
  None
  See application file for complete search history.

(56) References Cited

U.S. PATENT DOCUMENTS

| | | | |
|---|---|---|---|
| 2007/0038499 A1* | 2/2007 | Margulies | G06Q 10/06316 705/7.26 |
| 2008/0232575 A1* | 9/2008 | Gumbula | H04M 3/42221 379/265.11 |
| 2011/0033036 A1* | 2/2011 | Edwards | G06Q 30/02 379/265.09 |
| 2015/0350445 A1 | 12/2015 | Flannery et al. | |

* cited by examiner

*Primary Examiner* — Antim G Shah
(74) *Attorney, Agent, or Firm* — Plumsea Law Group, LLC

(57) ABSTRACT

A system and method for assisting with interactions between agents and customers using an artificially intelligent assistant is disclosed. The artificially intelligent assistant monitors interactions between agents and customers and identifies assistive actions to be taken that increase efficiency of the interaction as well as customer satisfaction. The artificially intelligent agent can also identify new communication modes appropriate for assistive actions, allowing agents to seamlessly communicate with customers over a wide range of different communication modes, such as phone calls, texts, emails and other messaging applications.

16 Claims, 9 Drawing Sheets

AI ASSISTANT FOR INTERACTING WITH CUSTOMERS ACROSS MULTIPLE COMMUNICATION MODES

CROSS-REFERENCE TO RELATED APPLICATIONS

This application is a continuation of and claims benefit to U.S. patent application Ser. No. 16/419,042, filed on May 22, 2019 and titled "AI Assistant for Interacting with Customers Across Multiple Communication Modes", which application claims the benefit of U.S. Provisional Patent Application Ser. No. 62/741,752, filed on Oct. 5, 2018 and titled "AI Assistant for Interacting with Customers Across Multiple Communication Modes", the disclosures of all of which applications are incorporated by reference herein in their entirety.

TECHNICAL FIELD

The present disclosure generally relates to a system and method for improving customer interactions, and in particular to an artificial intelligence assistant that can assist an agent in communicating with a customer over multiple different communication modes.

BACKGROUND

Customers often interact with one or more agents of a company to meet a desired need or goal. Customers can interact with sales agents to learn about and purchase one or more services or products. Customers may interact with agents to obtain answers to questions. In the field of insurance, customers may interact with agents as part of an insurance claim process. Moreover, different interactions may take place over different kinds of communication modes. Interactions can occur over the phone, by email or by text, for example.

Agents may use tools to facilitate customer interactions. Some of these tools may be provided as part of a customer relationship management (CMR) software package. However, CMR software and related tools are often customized for a particular task or communication mode. An agent may need to manually initiate one set of processes for interactions that take place over the phone, and another set of processes for interactions that take place through a chat-based service.

In addition, each customer interaction is treated as an individual event with little to no context. For each new interaction, access to information about previous interactions with the customer may be limited or completely unavailable. This may result in a sense of discontinuity and frustration for a customer who may need to re-explain something to different agents at different times, and may also prevent the company from observing a larger context within which customer information, including preferences and other trends, may be visible.

There is a need in the art for a system and method that addresses the shortcomings discussed above.

SUMMARY

In one aspect, a method of assisting an agent in interacting with a customer over multiple communication modes, the assistance being performed by an artificially intelligent assistant, includes the steps of monitoring the interaction between the agent and the customer, where the interaction occurs by a first communication mode. The method also includes analyzing information related to the interaction and generating an assistive action, the assistive action requiring the use of a second communication mode that is different than the first communication mode. The method also includes performing the assistive action, where part of performing the assistive action includes establishing communication with the customer through the second communication mode.

In another aspect, a method of assisting an agent in an interaction with a customer, the assistance being performed by an artificially intelligent assistant, includes the steps of monitoring the interaction between the agent and the customer and analyzing information related to the interaction and generating an assistive action. The method also includes notifying the agent about the assistive action and performing the assistive action.

In another aspect, a method of assisting an agent in an interaction with a customer, the assistance being performed by an artificially intelligent assistant, includes the steps of retrieving a first set of information about a previous interaction with the customer, monitoring a current customer interaction with an agent and extracting a second set of information related to the current customer interaction and analyzing the first set of information and a second set of information and generating an assistive action. The method also includes notifying the agent about the assistive action and performing the assistive action.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DESCRIPTION OF EMBODIMENTS

Figure 1:
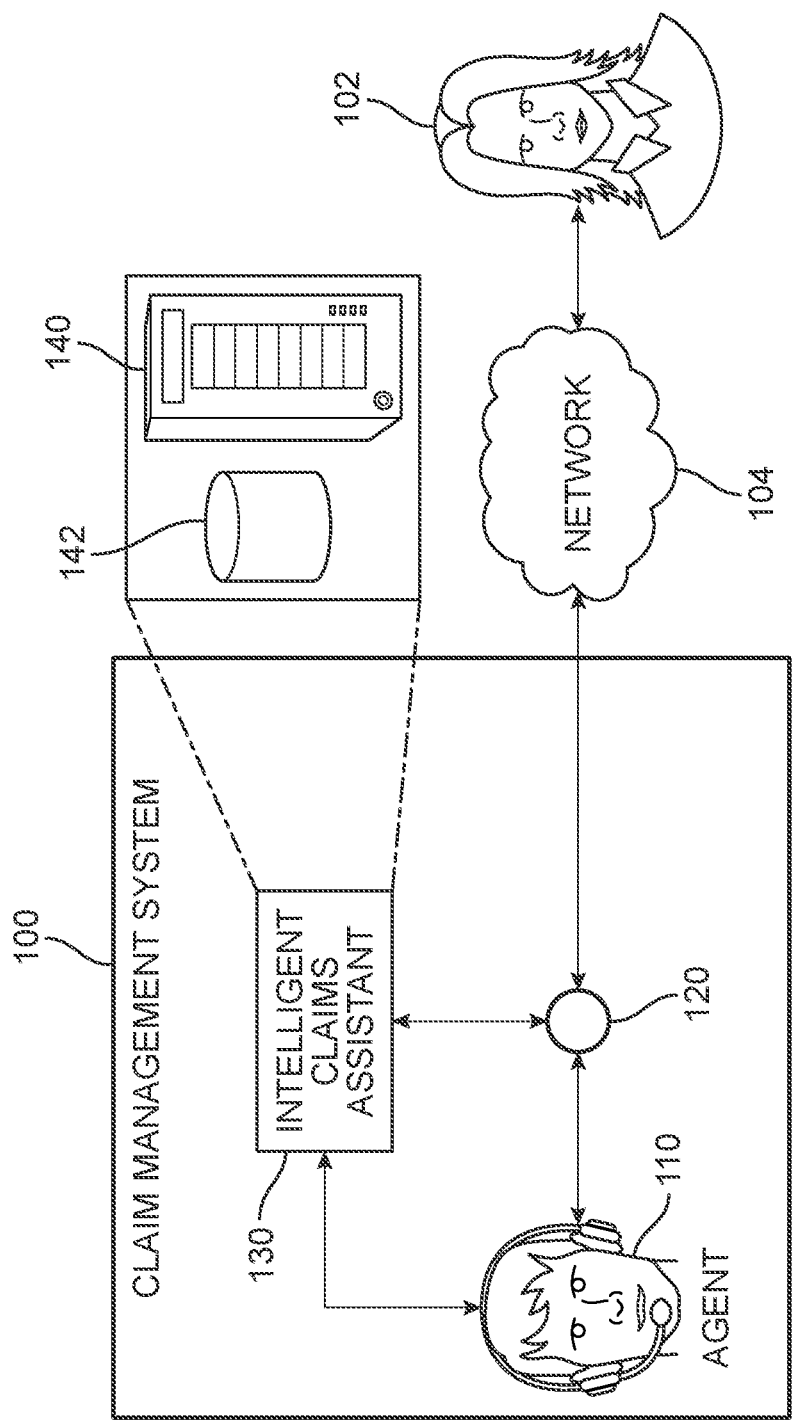
FIG. 1 is a schematic view of an embodiment of a claim management system for interacting with a customer.

The embodiments provide a system and method for assisting agents with customer interactions and/or for assistant agents in working through customer driven processes such as insurance claim processes. In particular, the embodiments provide an artificially intelligent (AI) assistant that can monitor interactions between agents and customers, identify potential assistive actions that can help the agent with one or more tasks, and perform one or more actions. The AI assistant can reduce the response time required for an agent to complete a task during a customer interaction and thereby improve customer satisfaction. The AI assistant achieves this by leveraging information across different communication modes (and at different times) to provide agents with additional context and suggestions for further actions to meet identified customer goals. The AI assistant can also reduce response time and improve customer satisfaction by identifying times when an agent needs to communicate with a customer through a different communication mode and initiating actions to open and disseminate information to the customer through the different communication mode. Moreover, because the AI assistant may use information from previous interactions and/or other contextual information that is not immediately available to an agent during an interaction, the AI assistant can anticipate actions that an agent might otherwise not consider.

As used herein, the terms "artificial intelligence" and "machine learning" may be used to describe a variety of techniques in which an algorithm can learn to improve its performance on a task (for example, classifying images into different categories). The embodiments can make use of any known methods and systems in artificial intelligence and/or machine learning.

The following embodiments provide systems and methods for assisting with interactions between an agent and a customer. Though the embodiments depict these systems and methods in the specific context of processing insurance claims, it may be appreciated that these systems and methods can be applied to various other contexts as well. These other contexts include, but are not limited to: banking and financial services, consumer products, call centers, as well as other business sectors.

The term "agent" as used herein, refers to any representative of a company that provides products or services. For example, in the context of a company providing insurance, an agent could be an insurance agent, a claims adjuster or any other employee or contractor of the company. Agents could be human agents or virtual agents. In some cases, a company may employ a mix of human and virtual agents, each type of agent being devoted to different sets of tasks. The term "customer" as used herein, refers to any beneficiary of services (or products) from a company. It may be appreciated that any principles described below for assisting with interactions between an agent and a customer could also be applied to interactions between agents and third party vendors.

FIG. 1 is a schematic view of an embodiment of a claim management system 100 that facilitates interactions about insurance claims with a customer 102 over a network 104. Claim management system 100 further includes an agent 110. In this embodiment, agent 110 is a human agent. Agent 110 may communicate with customer 102 to help prepare a new insurance claim, answer questions about an existing claim or perform other tasks related to the insurance claim process. Although FIG. 1 depicts a single agent 110, it may be appreciated that in other embodiments multiple agents may be involved in managing one or more insurance claims.

As discussed in further detail below, network 104 can comprise two or more different kinds of networks capable of facilitating communication over two more different kinds of communication modes. Communication modes may be routed through a communications gateway 120 (or portal) that provides the functionality for initiating, controlling and closing one or more communication modes between agent 110 and customer 102. Communications gateway 120 can be made accessible to agent 110 and/or other systems or services associated with claim management system 100.

Claim management system 100 may also include an intelligent claims assistant 130 (also referred to as simply "assistant 130"). Intelligent claims assistant 130 may be an artificially intelligent (AI) assistant that can respond to actions by an agent and/or a customer. Assistant 130 may be a virtual assistant that runs on a computer system. The term "computer system" refers to the computing resources of a single computer, the partial computing resources of a single computer, a plurality of computers communicating with one another, or a network of remote servers. In an exemplary embodiment, assistant 130 runs on at least one server.

Assistant 130 may receive information from various sources, perform various kinds of analyses and/or store data. In the embodiment of FIG. 1, assistant 130 comprises software running one or more computing devices 140 (for example, a server) that may be in communication with one or more databases 142. Databases 142 could be co-located with computing device 140 or could be remote databases that are accessible by computing device 140 over a network. Databases 142 can include any kind of storage devices, including but not limited magnetic, optical, magneto-optical, and/or memory, including volatile memory and non-volatile memory.

Intelligent claims assistant 130 may send information to, and receive information from, communications gateway 120. Additionally, intelligent claims assistant 130 can communicate directly with agent 110, bypassing communications gateway 120. For example, intelligent claims assistant 130 can send alerts and other messages to devices (for example, computers, tablets and cell phones) used by agent 110. In one embodiment, assistant 130 could communicate with an agent 110 using a chat application, even as the agent 110 is communicating with customer 102.

Figure 2:
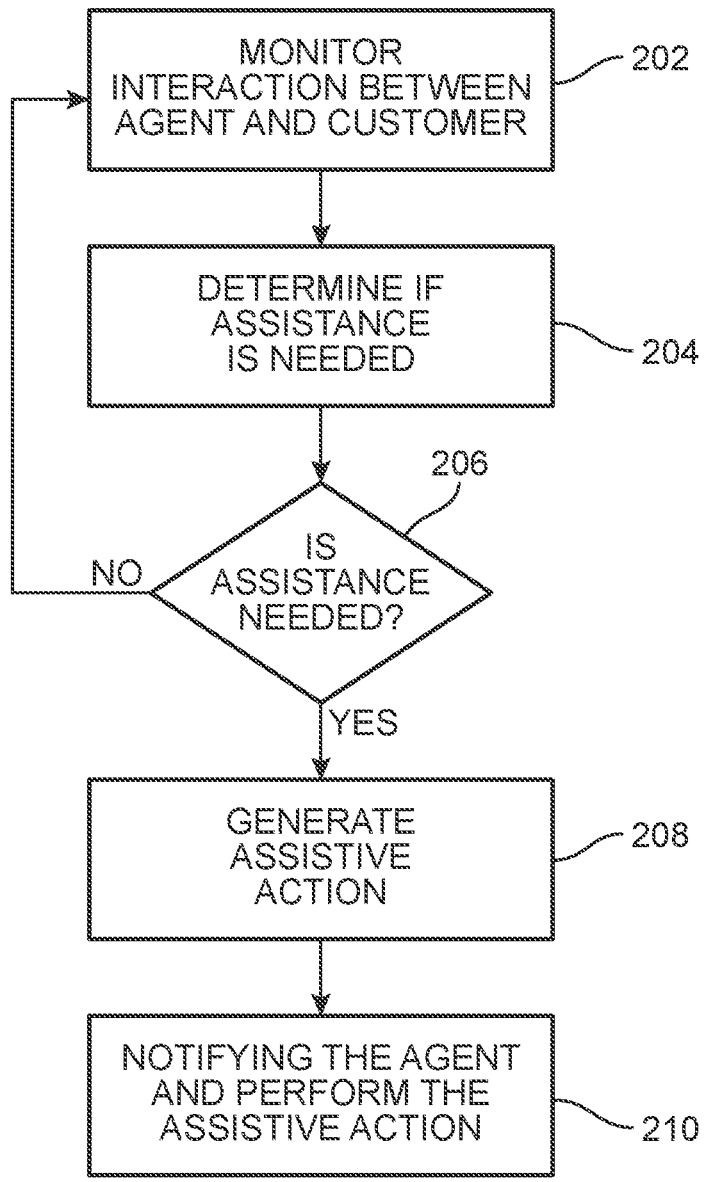
FIG. 2 is a schematic view of a process for assisting an agent in an interaction with a customer, according to an embodiment.

FIG. 2 is a schematic view of a process for providing assistance to an agent, where the assistance is provided within the context of an interaction between the agent and a customer. In one embodiment, the steps depicted in FIG. 2 may be performed by an AI assistant, for example, intelligent claims assistant 130. In other embodiments, one or more steps could be accomplished by another system or entity, for example, an agent.

In step 202, assistant 130 may monitor a current interaction between an agent and a customer. For example, in the present embodiment assistant 130 has access to communications passing through communications gateway 120, as shown in FIG. 1. Communication of various forms (for example, audible information and/or text-based information) between an agent and a customer may be received as inputs to assistant 130 for further processing. In some cases, information from the interaction could not only be analyzed in real-time, but could also be stored for future analysis. For example, information from an interaction could be stored in a database (for example, databases 142) for later retrieval by assistant 130 or an associated system.

In some cases, the step of monitoring the interaction may further include steps of filtering or otherwise pre-processing the information to prepare the information for further analysis in later steps. In other cases, the step of monitoring the interaction may only include receiving raw communications data (for example, raw audio data, raw ASCII data, as well as other kinds of data).

Next, in step 204, assistant 130 may analyze the information gathered during step 202 to determine if assistance is needed. This step could include various kinds of analyses known in the art for processing spoken words or text to identify context and meaning. In addition to analyzing the content of the conversation between an agent and a customer, assistant 130 may also identify customer sentiment (for example, using sentiment analysis techniques known in machine learning), vocal patterns and other information that may provide further context for deciding when and what kind of assistance to provide. By understanding the context and meaning of various parts of the interaction, assistant 130 can try to identify potential needs of the customer or agent that may be fully or partially met by actions that assistant 130 can take.

During the interaction, assistant 130 may also retrieve customer records to provide still further context. For example, if the conversation is regarding an insurance claim, assistant 130 may pull information about any insurance policies linked to the customer. This information may be used to decide the type of assistance that would be most useful for the customer.

The embodiments can make use of any techniques already known in the field of natural language processing (NLP). These include any techniques in speech recognition and natural language understanding. As an example, methods for training an AI to identify appropriate responses to natural language inputs are known and may utilize advances in the field of deep learning. For example, AIs may incorporate long short-term memory (LTSM) recurrent neural networks for learning to identify important content within natural language data.

Using NLP techniques, an artificially intelligent assistant can be trained to identify points in an ongoing interaction where assistance may be useful, and to select the appropriate type of assistance. In some cases, an assistant can be further trained to select appropriate communication modes for accomplishing a given task, as discussed in further detail below. As a specific example, an AI assistant can be trained to output one of a set of possible assistive actions in response to given inputs (for example, inputs in the form of interaction information between an agent and customer). The output could be provided by a neural network or any other kind of machine learning model or collection of models.

If assistant 130 determines that assistance is not needed at step 206, assistant 130 returns to step 202 to further monitor the interaction. If, during step 206, assistant 130 determines that assistance is needed, assistant 130 proceeds to step 208. At step 208, assistant 130 may notify the agent that assistant 130 of a potential assistive action, and in some cases, may perform the action after receiving confirmation from the agent. In some embodiments, notifying the agent could be optional and assistant 130 may perform assistive actions immediately and autonomously without any input from the agent. In other embodiments, assistant 130 may only notify the agent of a suggested assistive action, and may leave it to the agent to perform the action. For example, an assistant could prepare a draft email message with information requested by a customer and place the draft email in the agent's draft email folder, so that the agent can send the letter themselves at a later time.

An interaction between an agent and a customer may be ongoing and is not limited to a particular duration or single communication session. As an example, customers and agents may communicate throughout the duration of vehicle repairs at a repair facility. Often, agents do not receive regular updates from the repair facility. Meanwhile, customer's may talk with the repair facility and pass along information they learn as notes in an online claim tracking system. An AI assistant could monitor the tracking system for these notes. When new notes appear, the AI assistant could retrieve the information and pass it along to the responsible agent by way of an email along with a reminder to take action. This process could greatly improve the efficiency of the claim process as information is being delivered to the agents overseeing the claims immediately, rather than waiting for agents to manually check for information at irregular intervals.

Figure 3:
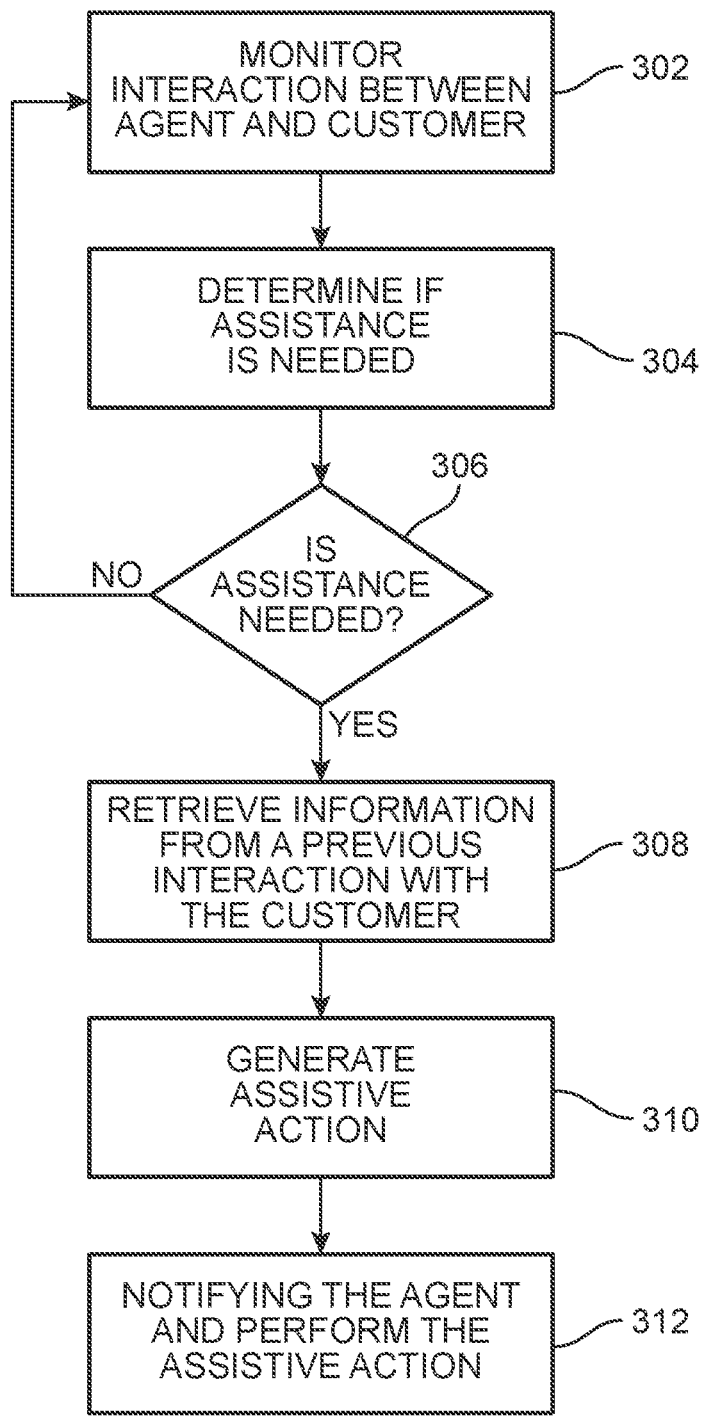
FIG. 3 is a schematic view of a process for assisting an agent in an interaction with a customer, according to another embodiment.

FIG. 3 is a process for providing assistance to an agent, according to another embodiment. The process depicted in FIG. 3 may include steps that are similar to the steps of the process show in FIG. 2.

In step 302 and step 304, assistant 130 may monitor an interaction and determine if assistance is needed as in step 202 and step 204 of the process depicted in FIG. 2. If no assistance is needed at step 306, assistant 130 may return to step 302 to continue monitoring the interaction. If assistance is needed, assistant 130 proceeds from step 306 to step 308.

At step 308, assistant 130 may retrieve information from a previous interaction with the customer. The previous interaction could be any interaction that takes place at an earlier time. Moreover, the previous interaction could be an earlier interaction with the same agent (for example, agent 110), or with a different agent. Furthermore, the previous interaction could have occurred on the same type of communication mode or on a different type of communication mode.

Information from a previous interaction could include any kind of information including, but not limited to: personal information about the customer, financial information about the customer, information related to an insurance claim, information related to one or more of the customer's insurance policies, information about an insured item (for example, electronics, jewelry, automobiles, other kinds of vehicles, as well as houses and other kinds of property), transcripts of a portion or all of a previous interaction, third party information (for example, information about a body shop the customer has used to repair a vehicle), as well as possibly other kinds of information.

Information can be stored and/or retrieved from one or more databases (for example, database 142) associated with assistant 130 and/or claim management system 100. Assistant 130 can retrieve all information from previous interactions involving a customer, or assistant 130 may target particular kinds of information for retrieval based on the type of assistance that may be needed.

In step 310, assistant 130 can analyze information from the current interaction (monitored in step 302) and the previous interaction (retrieved in step 308) to generate an assistive action.

Assistant 130 can also make use of general patterns and trends determined by analysis of previous interactions. These patterns and trends, once identified by assistant 130, could be stored for later use and/or updating. As one example in the context of claim processing, assistant 130 could identify patterns in a customer's tendency to use a particular body shop (over other available options) for getting their vehicle fixed after accidents. During an insurance claim process, assistant 130 could alert agent 110 to this tendency so the agent can ensure the customer gets his or her car fixed at their preferred body shop. As another example, analyzing trends in data retrieved over multiple customers, an assistant could determine that customers above a particular age (say, 40 years old) prefer using their own shops for vehicle repairs while younger customers prefer agents to simply tell them where to take their cars. Based on this general information, an assistant could provide suggestions to an agent about which shop the customer is likely to prefer, based on his or her age.

In step 312, assistant 130 could notify the agent of the proposed assistive action and/or perform the assistive action as in step 208 of the process depicted in FIG. 2.

Figure 4:
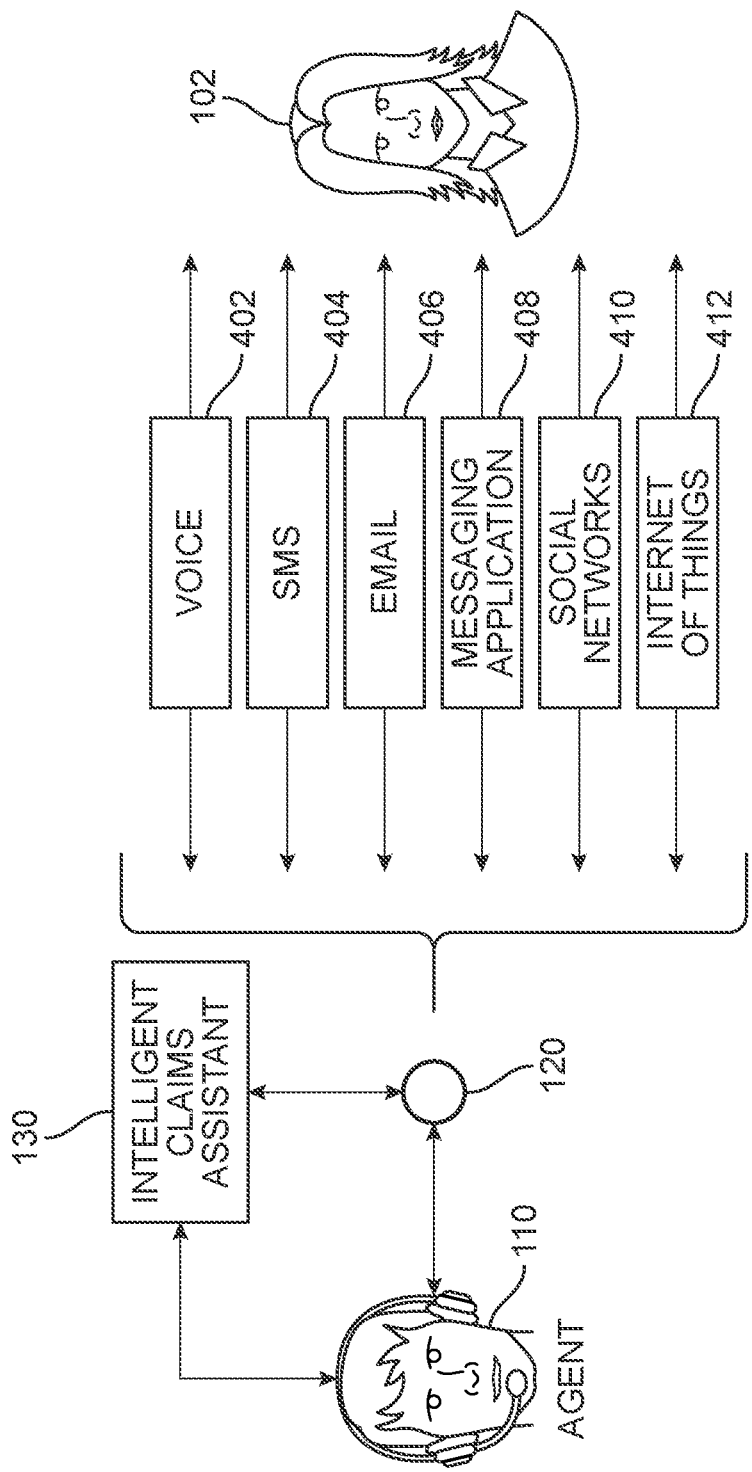
FIG. 4 is a schematic view of components of a claim management system and multiple communication modes between the claim management system and a customer, according to an embodiment.

FIG. 4 is a schematic view depicting various possible communication modes between a claim management system and a customer, according to an embodiment. As used herein, the term "communication mode" refers to a particular form of communication, such as audio based communication (i.e, a phone call), video based communication (i.e., a video call), and various modes of text based communication, as well as other modes of analog or digital communication. It may be appreciated that different modes of communication require different kinds of information to be transmitted, which may be associated with different kinds of data representations or data formats. Thus, the type of data (i.e., representation or format) used to transmit spoken words for a phone call will be different from the type of data used to transmit typed words via SMS messages.

Often, during an interaction with a customer, an agent may need to communicate with the customer using more than a single kind of communication mode. Conventional CMR tools are specific to a single kind of communication mode (for example, email), and so are not useful in situations where an agent must switch communication modes as part of completing a task. By contrast, the intelligent claims assistant of the present embodiments may be capable of performing assistive actions across various different communication modes.

In the embodiment shown in FIG. 4, agent 110 may communicate with customer 102 through a voice communication mode 402 for phone calls, an SMS mode 404 for texts, an email communication mode 406 for emails, a messaging application mode 408 for application specific messaging, a social network mode 410 for posting and retrieving messages from social network sites, and an internet of things (IOT) mode 412 for sending and receiving messages from IOT connected devices (for example, smart thermostats and smart appliances). Though not listed, in some cases an agent may also communicate using a separate video mode. In some cases, voice and video modes may be integrated as a single communication mode.

To provide assistance in situations where an agent may need to communicate with a customer using two or more communication modes, an insurance claim assistant may include provisions for sending/receiving and interpreting information via various different communication modes. In the exemplary embodiment, assistant 130 may incorporate software for sending/receiving and interpreting information from any of the communication modes listed above and shown in FIG. 4.

Figure 5:
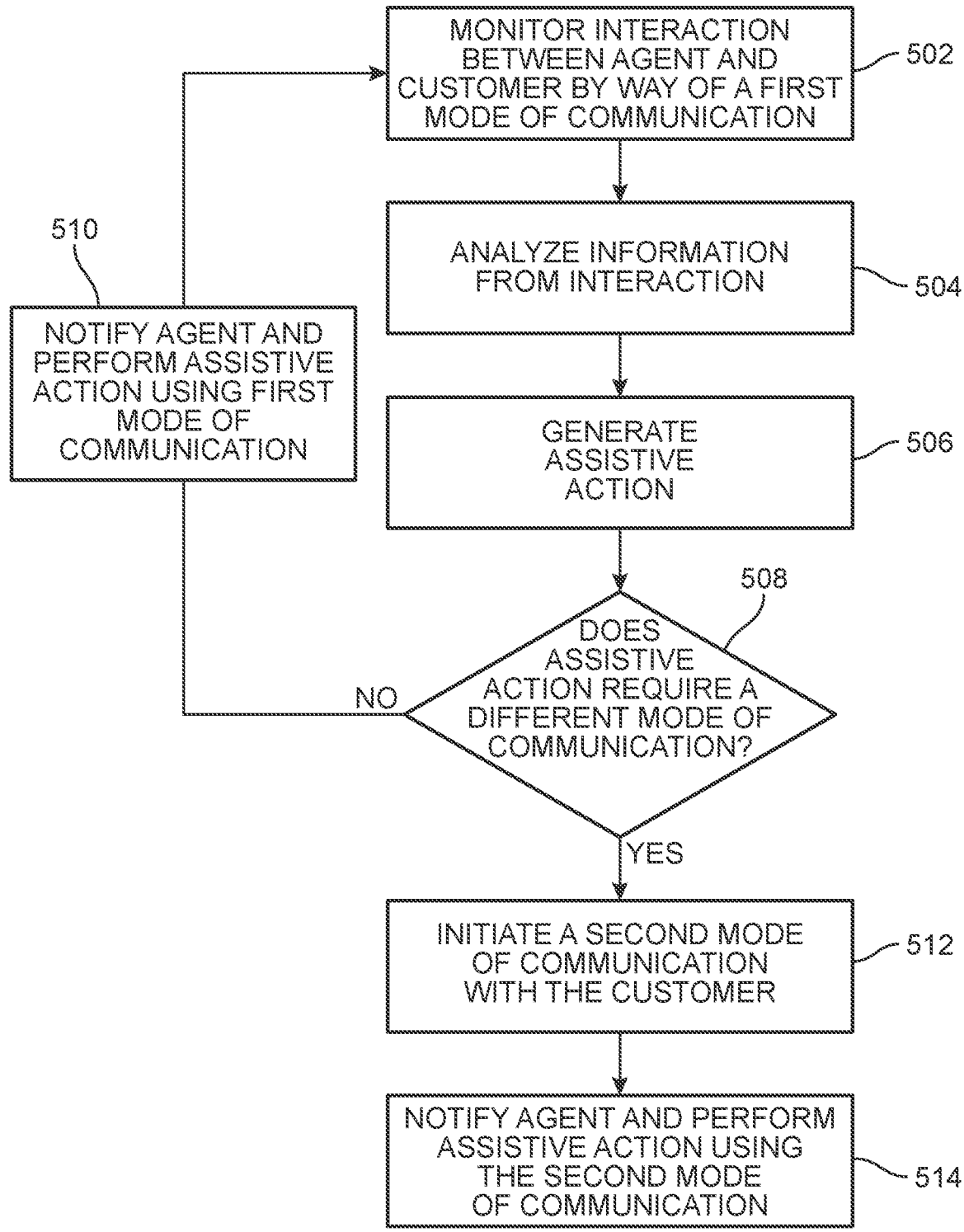
FIG. 5 is a schematic view of a process for assisting an agent in an interaction with a customer, where the process includes selecting another communication mode, according to an embodiment.

FIG. 5 is a schematic view of a process for assisting an agent with a customer interaction. More specifically, FIG. 5 depicts a process where an AI assistant identifies a new communication mode for interacting with a customer. In step 502, assistant 130 monitors an interaction between an agent and a customer as in the processes of FIGS. 3-4. In this case, the interaction occurs by way of a first communication mode. For example, the interaction may occur by way of a telephone conversation between the agent and the customer. Next, in step 504 and step 506, assistant 130 analyzes information from the interaction and generates an assistive action.

At step 508, assistant 130 determines if the assistive action requires a new communication mode. If not, assistant 130 proceeds to step 510 to notify the agent and/or perform the assistive action by way of the first communication mode. If, during step 508, assistant 130 determines that the assistive action requires a new communication mode then assistant 130 proceeds to step 512.

At step 512, assistant 130 initiates a second communication mode with the customer. For example, assistant 130 could compose an email or SMS text as the second communication mode. In another situation where agent 110 and customer 102 are communicating through text-based chat program (as the first communication mode), assistant 130 could initiate a phone call between agent 110 and customer 102 (as the second communication mode).

Following step 512, at step 514, assistant 130 may notify the agent of the proposed assistive action and/or perform the assistive action as in step 208 of the process depicted in FIG. 2. For example, assistant 130 could send an email or text message that has been approved by agent 110.

Figure 6:
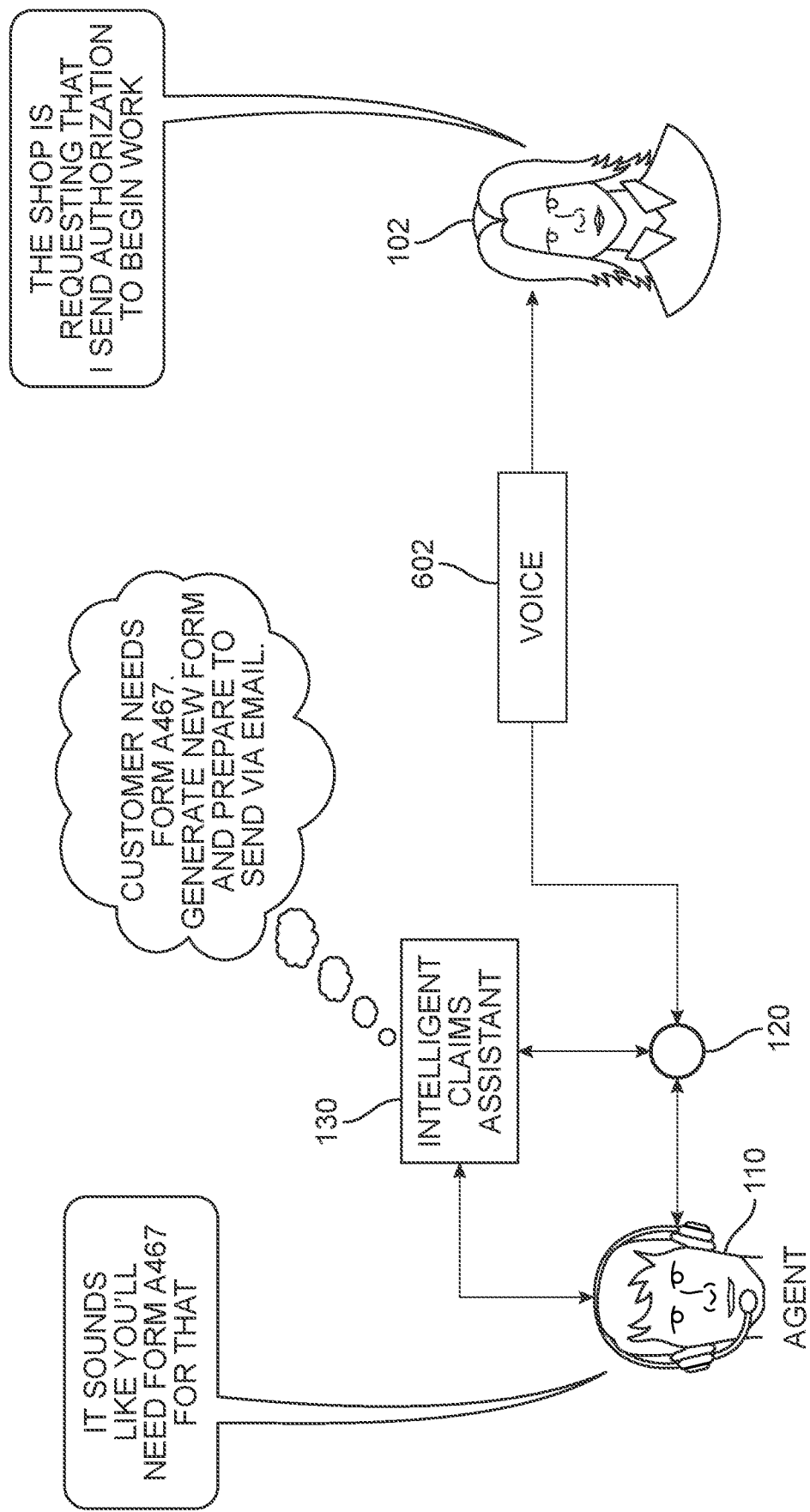
FIGS. 6-8 are schematics view of steps in a process for assisting an agent by monitoring a phone call between the agent and a customer, and automatically generating an email to be sent to the customer, according to an embodiment.
Figure 7:
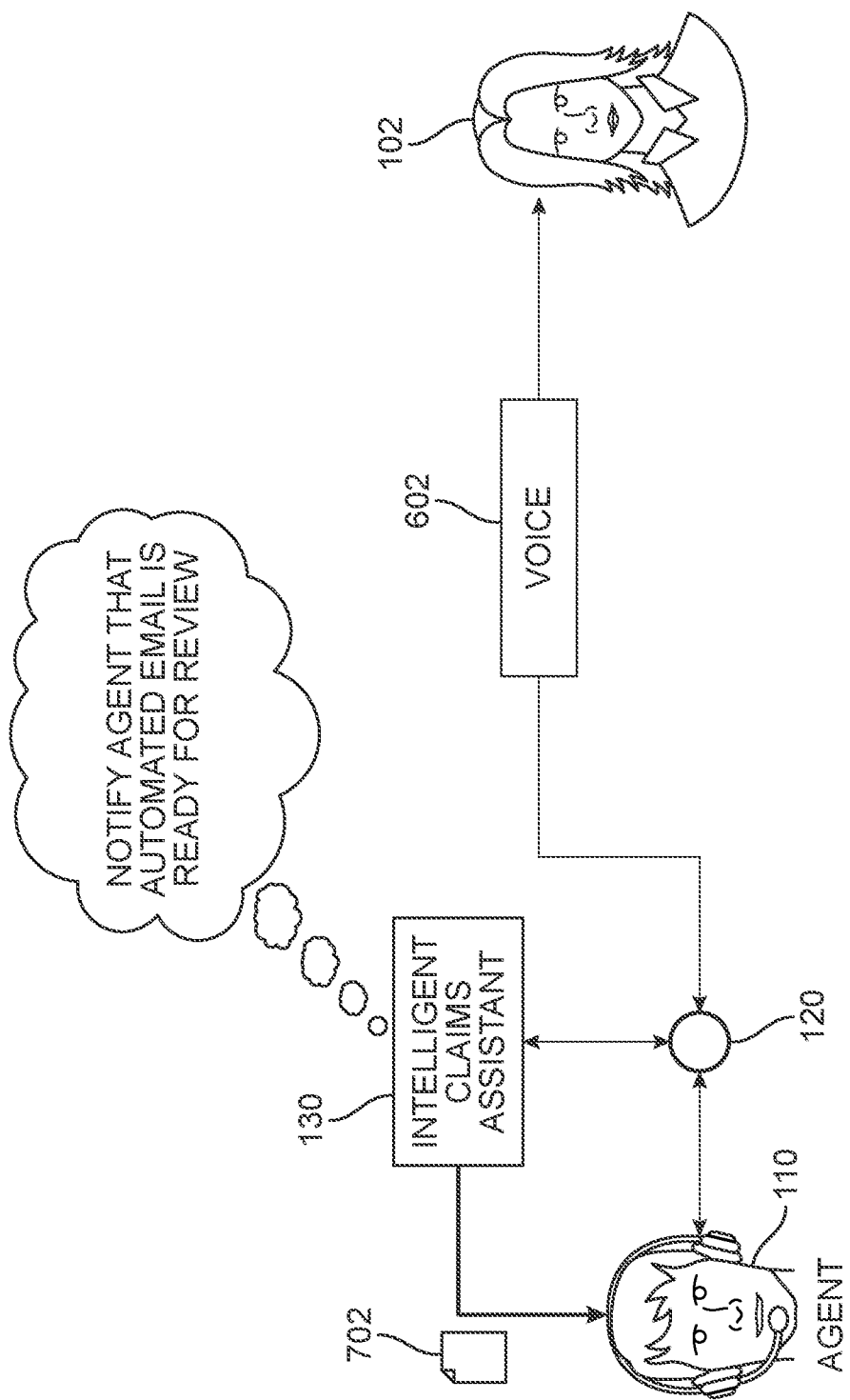
Figure 8:
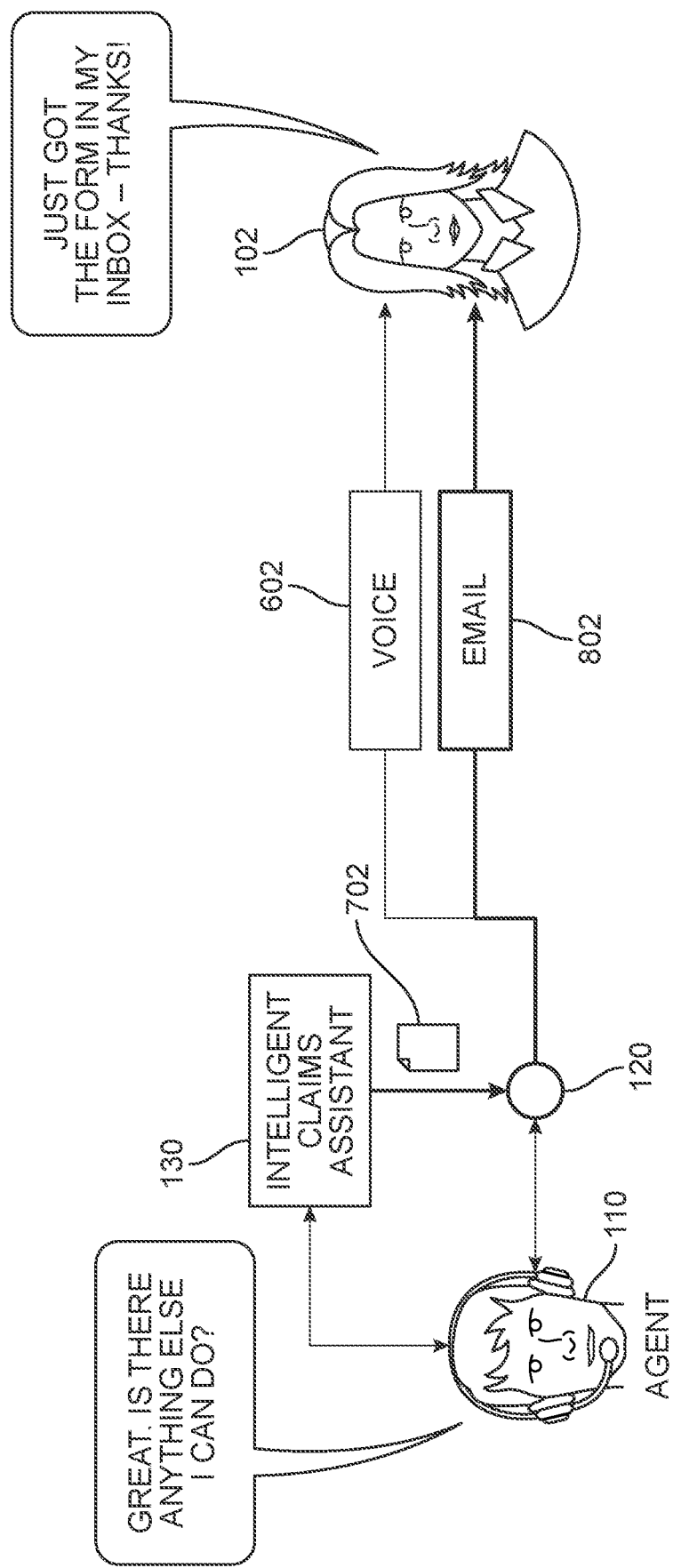

FIGS. 6-8 depict an example of a situation where an insurance claim assistant performs an assistive action including opening a new communication mode with a customer in response to information from the customer-agent interaction. Referring to FIG. 6, agent 110 and customer 102 are interacting by way of a phone call (that is, a first communication mode 602) about an ongoing insurance claim. Assistant 130 is monitoring their interaction (listening) in order to provide assistance. During the interaction customer 102 explains to agent 110 that the body shop where her vehicle is supposed to be fixed has requested authorization from the insurance company to begin work on the vehicle. In response, agent 110 mentions that the customer will need to provide the body shop with a particular form authorizing work. At this point, assistant 130, which has been monitoring the phone conversation, identifies a potential assistive action that can be taken to improve the efficiency of interaction (that is, reduce response time for the agent to complete a task) and the customer's satisfaction level. Specifically, assistant 130 identifies the customer's need for a particular form, and further determines that it can take actions to pre-fill the form and prepare an email for sending the form to the customer. As part of this process, assistant 130 identifies the need to initiate a second communication mode (an email mode) with the customer.

In FIG. 7, assistant 130 submits a draft email 702 to agent 110, attaching the pre-filled form. In addition to sending the email for review (or populating the agent's inbox with an email draft), assistant 130 may also provide a separate notification to agent 110. This notification could include a pop-up notification on a computer or other device that agent 110 is using while talking to customer 102.

In FIG. 8, following approval from agent 110, assistant 130 may automatically send email 702, including the attached form that the customer needs, to customer 102. That is, agent 110 initiates an email communication mode (second communication mode 802) with customer 102 and sends information to customer 102 by way of this second communication mode. In response, customer 102 acknowledges that she's received the form in her email inbox. Agent 110 then follows up to ask if there's anything else the customer needs.

In the process depicted in FIGS. 6-8, assistant 130 provides seamless support that is invisible to the customer. From the customer's point of view, the interaction is more efficient, as there is no waiting for the agent to find and fill out the requisite form. This may generally result in increased customer satisfaction with the insurance claim process.

An AI assistant may utilize one or more machine learning systems or models to generate assistive actions, including opening and utilizing new communication modes between an agent and a customer. As used herein, the term "machine learning system" refers to any collection of one or more machine learning algorithms. Some machine learning systems may incorporate various different kinds of algorithms, as different tasks may require different types of machine learning algorithms. Generally, a machine learning system will take input data and output one or more kinds of predicted values. The input data could take any form including image data, text data, audio data or various other kinds of data. The output predicted values could be numbers taking on discrete or continuous values. The predicted values could also be discrete classes (for example, a "damaged" class and an "undamaged" class). Numerical outputs could represent a probability that the input belongs to a various classes. Moreover, it may be appreciated that the same machine learning system can be used for training, testing and deployment, in some cases.

Figure 9:
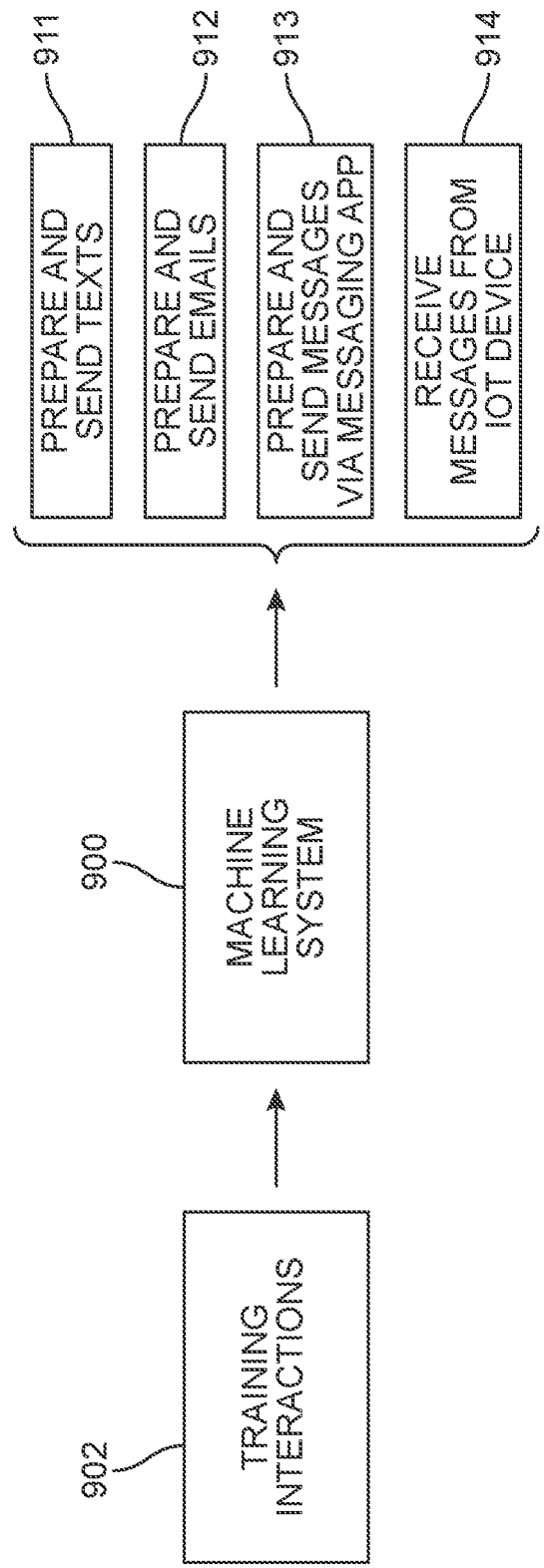
FIG. 9 is a schematic view of a machine learning system that can be trained to identify an appropriate communication mode for interacting with a customer, according to an embodiment.

FIG. 9 is a schematic view of a machine learning system 900 that may be used to predict what type of new communication mode should be used to communicate information based on information from an interaction between an agent and a customer. More specifically, FIG. 9 depicts a training process for machine learning system 900, though it may be appreciated that this same system can also be used for testing and deployment.

Referring to FIG. 9, machine learning system 900 may be trained using training interactions 902. Training interactions could be simulated interactions or historical interactions between agents and clients. Based on the information comprising the training interactions, machine learning system 900 outputs a likely assistive action associated with a particular communication mode. As examples, machine learning system 900 includes a first output 911, a second output 912, a third output 913, and a fourth output 914. First output 911 corresponds to an action where an assistant prepares and sends information in the form of SMS messages, or texts. Such a response may be appropriate when an agent needs to send a customer a small amount of information, such as a phone number for a body shop or a rental car company. Second output 912 corresponds to an action where an assistant prepares and sends emails. Such a response may be appropriate when an agent needs to send a large amount of information and/or needs to send forms or other files, such as pdf forms. Third output 913 corresponds to an action where an assistant prepares and sends messages via a particular messaging application. In contrast to SMS messages that are standardized, many third party companies provide proprietary messaging applications used by individuals and/or companies. Such a response may be appropriate when the assistant is aware of a customer's preference for communicating through a particular messaging application and/or if the messaging application is optimal for sending particular file types. Fourth output 914 corresponds to an action where an assistant receives information from an Internet of Things enabled device. Such a response may be appropriate when the assistant determines that an agent or customer needs information that is tracked by an IOT device in the customer's home or vehicle.

In some embodiments, various systems such as a machine learning system could be implemented on a centralized computer system. In some embodiments, a machine learning system could be provided through a cloud service.

The processes and methods of the embodiments described in this detailed description and shown in the figures can be implemented using any kind of computing system having one or more central processing units (CPUs) and/or graphics processing units (GPUs). The processes and methods of the embodiments could also be implemented using special purpose circuitry such as an application specific integrated circuit (ASIC). The processes and methods of the embodiments may also be implemented on computing systems including read only memory (ROM) and/or random access memory (RAM), which may be connected to one or more processing units. Examples of computing systems and devices include, but are not limited to: servers, cellular phones, smart phones, tablet computers, notebook computers, e-book readers, laptop or desktop computers, all-in-one computers, as well as various kinds of digital media players.

The processes and methods of the embodiments can be stored as instructions and/or data on non-transitory computer-readable media. Examples of media that can be used for storage include erasable programmable read-only memory (EPROM), electrically erasable programmable read-only memories (EEPROM), solid state drives, magnetic disks or tapes, optical disks, CD ROM disks and DVD-ROM disks.

The embodiments may utilize any kind of network for communication between separate computing systems. A network can comprise any combination of local area networks (LANs) and/or wide area networks (WANs), using both wired and wireless communication systems. A network may use various known communications technologies and/or protocols. Communication technologies can include, but are not limited to: Ethernet, 802.11, worldwide interoperability for microwave access (WiMAX), mobile broadband (such as CDMA, and LTE), digital subscriber line (DSL), cable internet access, satellite broadband, wireless ISP, fiber optic internet, as well as other wired and wireless technologies. Networking protocols used on a network may include transmission control protocol/Internet protocol (TCP/IP), multiprotocol label switching (MPLS), User Datagram Protocol (UDP), hypertext transport protocol (HTTP) and file transfer protocol (FTP) as well as other protocols.

Data exchanged over a network may be represented using technologies and/or formats including hypertext markup language (HTML), extensible markup language (XML), Atom, JavaScript Object Notation (JSON), YAML, as well as other data exchange formats. In addition, information transferred over a network can be encrypted using conventional encryption technologies such as secure sockets layer (SSL), transport layer security (TLS), and Internet Protocol security (Ipsec).

While various embodiments of the invention have been described, the description is intended to be exemplary, rather than limiting, and it will be apparent to those of ordinary skill in the art that many more embodiments and implementations are possible that are within the scope of the invention. Accordingly, the invention is not to be restricted except

The invention claimed is:

1. A method of assisting an agent in interacting with a customer over multiple communication modes, the assistance being performed by an artificially intelligent assistant, comprising the steps of:
analyzing information related to a plurality of interactions between at least one agent and at least one customer to train the artificially intelligent assistant;
based on the analyzed information, generating a plurality of assistive actions, wherein each assistive action is associated with a particular communication mode that is different for each assistive action;
monitoring an interaction between an agent and a customer, the interaction occurring by a first communication mode;
analyzing information related to the interaction between the agent and the customer and generating a selected assistive action from the plurality of assistive actions, the selected assistive action requiring the use of a second communication mode that is the particular communication mode associated with the selected assistive action; and
performing the selected assistive action, wherein part of performing the selected assistive action includes establishing communication with the customer through the second communication mode, wherein the second communication mode is different than the first communication mode.

2. The method according to claim 1, wherein the first communication mode is a phone call.

3. The method according to claim 2, wherein the second communication mode is an email.

4. The method according to claim 2, wherein the second communication mode is a short message service.

5. The method according to claim 2, wherein the second communication mode is mediated by a chat application.

6. The method according to claim 1, wherein the first communication mode is mediated by a chat application.

7. The method according to claim 6, wherein the second communication mode is a phone call.

8. The method according to claim 6, wherein the second communication mode is an email.

9. The method according to claim 1, wherein the selected assistive action is chosen based on an amount of information that the agent is sending to the customer.

10. The method according to claim 1, wherein analyzing information to train the artificially intelligent assistant includes inputting the information into a machine learning model; and
wherein the output of the machine learning model is used to generate the plurality of assistive actions.

11. The method according to claim 1, wherein at least one of the plurality of assistive actions is associated with an Internet of Things enabled device belonging to the customer.

12. A system for assisting an agent in interacting with a customer over multiple communication modes, the system comprising:
a communication network configured to allow communication between an agent and a customer over multiple communication modes; and
an artificially intelligent assistant, wherein the artificially intelligent assistant is configured to:
analyze information related to a plurality of interactions between at least one agent and at least one customer to train the artificially intelligent assistant;
based on the analyzed information, generate a plurality of assistive actions, wherein each assistive action is associated with a particular communication mode that is different for each assistive action;
monitor an interaction between an agent and a customer, the interaction occurring by a first communication mode;
analyze information related to the interaction between the agent and the customer and generate a selected assistive action from the plurality of assistive actions, the selected assistive action requiring the use of a second communication mode that is the particular communication mode associated with the selected assistive action; and
perform the selected assistive action, wherein part of performing the selected assistive action includes establishing communication with the customer through the second communication mode, wherein the second communication mode is different than the first communication mode.

13. The system according to claim 12, wherein the artificially intelligent assistant is implemented on a centralized computer system.

14. The system according to claim 12, wherein the artificially intelligent assistant is implemented through a cloud computing service.

15. The system according to claim 12, wherein the artificially intelligent assistant is configured to analyze information to train the artificially intelligent assistant by inputting the information into a machine learning model; and
wherein the output of the machine learning model is used to generate the plurality of assistive actions.

16. The system according to claim 12, further comprising at least one Internet of Things enabled device belonging to the customer; and
wherein at least one of the plurality of assistive actions is associated with the Internet of Things enabled device belonging to the customer.

* * * * *